(12) United States Patent
Huguet et al.

(10) Patent No.: US 10,358,746 B2
(45) Date of Patent: Jul. 23, 2019

(54) SIZED YARN INTENDED TO UNDERGO A TEXTILE OPERATION

(71) Applicant: SAFRAN CERAMICS, Le Haillan (FR)

(72) Inventors: Chrystel Huguet, Margaux (FR); Sylvie Loison, Saint Medard en Jalles (FR); Hervé Evrard, Le Haillan (FR)

(73) Assignee: SAFRAN CERAMICS, Le Haillan (FR)

( * ) Notice: Subject to any disclaimer, the term of this patent is extended or adjusted under 35 U.S.C. 154(b) by 264 days.

(21) Appl. No.: 15/121,942

(22) PCT Filed: Feb. 20, 2015

(86) PCT No.: PCT/FR2015/050419
§ 371 (c)(1),
(2) Date: Aug. 26, 2016

(87) PCT Pub. No.: WO2015/128569
PCT Pub. Date: Sep. 3, 2015

(65) Prior Publication Data
US 2017/0073854 A1 Mar. 16, 2017

(30) Foreign Application Priority Data
Feb. 28, 2014 (FR) ...................... 14 51646

(51) Int. Cl.
*D02G 3/16* (2006.01)
*C04B 35/628* (2006.01)
(Continued)

(52) U.S. Cl.
CPC ......... *D02G 3/16* (2013.01); *C04B 35/62844* (2013.01); *C04B 35/62863* (2013.01);
(Continued)

(58) Field of Classification Search
CPC . D02G 3/16; D06M 15/643; C04B 35/62844; C04B 35/62868;
(Continued)

(56) References Cited

U.S. PATENT DOCUMENTS 5,571,442 A * 11/1996 Masaki ...................... D01F 9/22
106/287.11
2006/0134415 A1* 6/2006 Gogotsi .............. C04B 35/6229
428/375

(Continued)

FOREIGN PATENT DOCUMENTS

EP 1 837 424 A1 9/2007
FR 2 983 193 A1 5/2013
(Continued)

OTHER PUBLICATIONS

International Search Report as issued in International Patent Application No. PCT/FR2015/050419, dated May 15, 2015.
(Continued)

*Primary Examiner* — Shaun R Hurley
(74) *Attorney, Agent, or Firm* — Pillsbury Winthrop Shaw Pittman LLP

(57) ABSTRACT

A sized yarn for subjecting to a textile operation, the yarn including a plurality of ceramic and/or carbon fibers; an interphase coating covering the fibers; and a film covering the interphase coating and including a linear polysiloxane.

17 Claims, 4 Drawing Sheets

(51) Int. Cl.
*C04B 35/634* (2006.01)
*C04B 35/638* (2006.01)
*D06M 15/643* (2006.01)
*C04B 35/80* (2006.01)
*D06M 101/40* (2006.01)

(52) U.S. Cl.
CPC .. *C04B 35/62868* (2013.01); *C04B 35/62873* (2013.01); *C04B 35/62894* (2013.01); *C04B 35/62897* (2013.01); *C04B 35/634* (2013.01); *C04B 35/638* (2013.01); *C04B 35/63448* (2013.01); *C04B 35/806* (2013.01); *D06M 15/643* (2013.01); *C04B 2235/5244* (2013.01); *C04B 2235/5248* (2013.01); *D06M 2101/40* (2013.01); *D06M 2200/40* (2013.01); *D10B 2505/02* (2013.01)

(58) Field of Classification Search
CPC ........ C04B 35/62873; C04B 35/62894; C04B 35/62897; C04B 35/638
See application file for complete search history.

(56) References Cited

U.S. PATENT DOCUMENTS

| | | | | |
|---|---|---|---|---|
| 2009/0280257 | A1* | 11/2009 | Morrison | C04B 35/62873 427/376.2 |
| 2011/0311804 | A1* | 12/2011 | Diss | C04B 41/009 428/325 |
| 2014/0030076 | A1* | 1/2014 | Nunez | F01D 5/282 415/183 |
| 2015/0008613 | A1* | 1/2015 | Bouillon | C04B 35/573 264/232 |

FOREIGN PATENT DOCUMENTS

| | | |
|---|---|---|
| RU | 2506251 C2 | 2/2014 |
| SU | 812866 A1 | 3/1981 |

OTHER PUBLICATIONS

Office Action and Search Report as issued in Russian Patent Application No. 2016138362, dated Sep. 11, 2018.

\* cited by examiner

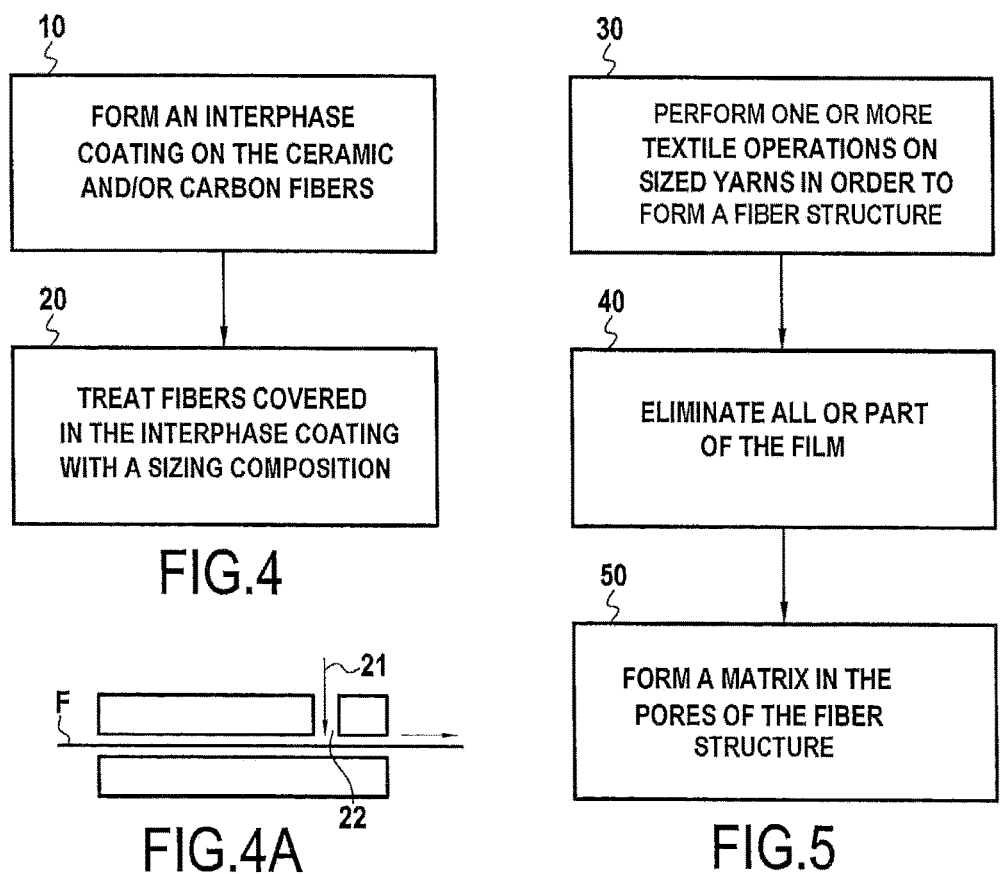
FIG.4
FIG.4A
FIG.5
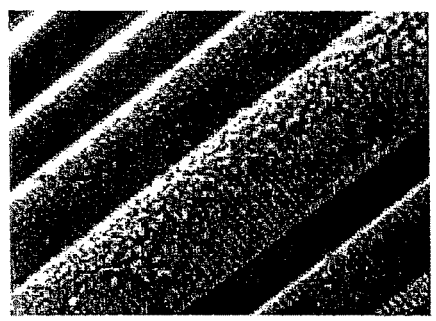
FIG.6A
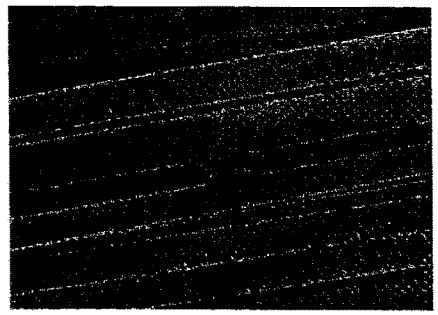
FIG.6B

SIZED YARN INTENDED TO UNDERGO A TEXTILE OPERATION

CROSS-REFERENCE TO RELATED APPLICATIONS

This is the U.S. National Stage of PCT/FR2015/050419, filed Feb. 20, 2015, which in turn claims priority to French Patent Application No. 1451646, filed Feb. 28, 2014, the entire contents of all applications are incorporated herein by reference in their entireties.

BACKGROUND OF THE INVENTION

The invention relates to sized yarns for subjecting to one or more textile operations, and it also relates to associated methods.

Yarns comprising a plurality of SiC or carbon fibers may be subjected to textile operations, and in particular to weaving operations, in order to form fiber structures. The pores in such fiber structures can then be filled in with a matrix in order to obtain composite material parts in which the fiber structure performs a mechanical reinforcement function.

Documents US 2014/0030076 and FR 2 983 193 describe making parts out of composite materials. Document U.S. Pat. No. 5,571,442 describes textile treatment compositions.

Nevertheless, when the fibers of yarns are covered in an interphase coating, performing textile operations can lead to the interphase coating being damaged.

It would be desirable for yarns based on fibers covered in an interphase coating to be treated so as to impart satisfactory protection to the interphase coating during textile operations. It would also be desirable for the treatment not to affect the flexibility and in particular the weaveability of treated yarns.

In addition, it would also be advantageous for the protective deposit that results from such treatment to be easily eliminated once the textile operations have been performed.

So far as the inventors are aware, there does not exist at present any treatment for yarns based on fibers covered in an interphase coating that presents the above-mentioned advantageous properties.

There therefore exists a need to have available a treatment for protecting yarns based on fibers covered in an interphase coating that enables the yarns to conserve, after being treated, the ability to be subjected to a textile operation, while also serving to protect the interphase coating during said textile operation.

In particular, there exists a need to have available a treatment for protecting yarns based on fibers covered in an interphase coating that enables the yarns, after treatment, to conserve satisfactory flexibility and weaveability, while also enabling the interphase coating to be protected during weaving operations.

There also exists a need to have available a treatment for protecting yarns based on fibers covered in an interphase coating that leads to a protective coating that can easily be eliminated.

OBJECT AND SUMMARY OF THE INVENTION

To this end, in a first aspect, the invention provides a sized yarn for subjecting to a textile operation, the yarn comprising:
 a plurality of ceramic and/or carbon fibers;
 an interphase coating covering the fibers; and
 a film covering the interphase coating and including a linear polysiloxane.

The term "polysiloxane" should be understood as designating a polymer having a chemical structure backbone of the $—(SiR_1R_2O)_n—$ type where $R_1$ and $R_2$ are substituents bonded to silicon and n is the repetition number of siloxane motifs and is an integer greater than or equal to 2. In the context of the invention, n is selected so that the siloxane is liquid at ambient temperature (20° C.). Selecting n in this way advantageously facilitates spreading the polysiloxane on the fibers covered in the interphase coating.

Using a linear polysiloxane thus makes it possible to spread the polymer well on the fibers covered in the interphase coating, thereby causing a protective film to be formed on the treated fibers.

The inventors have observed that the presence of a film including linear polysiloxane advantageously makes it possible to obtain a yarn that is sufficiently flexible to be subjected in satisfactory manner to one or more textile operations while also protecting the interphase coating during the textile operation(s).

By way of example, the yarn may be for weaving, but as described in greater detail below, the yarn of the invention may also be used in other types of textile operation.

In particular, the inventors have observed that the presence of a film including linear polysiloxane advantageously makes it possible to obtain a yarn that conserves a flexible and weaveable nature while providing protection to the interphase coating during weaving operations.

Furthermore, selecting such linear polymer families advantageously makes it possible to obtain a coating that can easily be eliminated after the textile operations. Specifically, using linear polymers advantageously makes it possible when the film is subjected to heat treatment to obtain thermal decomposition that is almost total, thereby greatly limiting the quantity of undesired residual deposits. Thus, more than 90%, or indeed more than 95% of the weight of the film can be eliminated during heat treatment having a duration of 4 hours at a temperature of 900° C. under an inert atmosphere.

Furthermore, the interphase coating advantageously enables the mechanical strength of the fibers to be increased when they constitute fiber reinforcement present within a matrix by making it possible in particular to deflect any cracks in the matrix so that they do not affect the integrity of the fibers.

In an embodiment, the interphase coating may be discontinuous, i.e. without continuity of material between the interphase coatings covering each of the fibers. The inter-phase coating is then formed by the combination of all of the interphase coatings covering each of the fibers. Under such circumstances, an interphase coating is initially formed on each of the fibers and then the fibers are grouped together to form a yarn, after which the film is formed.

In a variant, the fibers are initially grouped together in a yarn, and then the interphase coating is formed, after which the film is formed. It is preferable in the context of the invention to form the interphase coating after the fibers have been grouped together in a yarn.

Ceramic fibers may comprise oxide type fibers, e.g. Nextel 610 fibers and/or Nextel 720 fibers from the supplier 3M, nitride type fibers, carbide type fibers, e.g. SiC fibers, and mixtures of such fibers.

In an embodiment, the fibers include SiC fibers. In particular, all of the fibers may be SiC fibers.

In a variant, the fibers include carbon fibers. In particular, all of the fibers may be carbon fibers.

In an embodiment, the fibers comprise both SiC fibers and carbon fibers.

In an embodiment, the polysiloxane has a chemical backbone structure of the —$(SiR_1R_2O)_n$— type where n is as defined above and where $R_1$ and $R_2$ represent, independently of each other: a hydrogen atom; a halogen atom; an —OH group; a saturated or unsaturated aliphatic hydrocarbon chain having 1 to 30 carbon atoms optionally interrupted by one or more heteroatoms or by one or more substituted or non-substituted carbonyl groups; an aryl or aralkyl group having a number of carbon atoms less than or equal to 30; or an —$OR_3$ group, where $R_3$ represents an alkyl, alkene, alkyne, aryl, or aralkyl group having 1 to 30 carbon atoms.

In an embodiment, the polysiloxane has a chemical formula of the X—$(SiR_1R_2O)_n$—Y type where $R_1$ and $R_2$ and n are as defined above and where X and Y are the terminal groups of the polymer. X and Y may be any group, and in particular they may be selected from: —$CH_3$, —$Si(CH_3)_3$, or —OH.

The polysiloxane may preferably be a linear poly(dimethylsiloxane) (PDMS). Under such circumstances, the polymer has a chemical structure of the —$(Si(CH_3)_2O)_n$— where n is as defined above.

In particular, the polysiloxane may have the following chemical formula: X—$[Si(CH_3)_2O]_n$—Y where X and Y are the terminal groups of the polymer and n is as defined above. In particular, the polysiloxane may have the following chemical formula: $CH_3[Si(CH_3)_2O]_nSi(CH_3)_3$ where n is as defined above.

In an embodiment, the interphase coating may include, and in particular may consist of, pyrolytic carbon (PyC), boron-doped carbon (BC), or BN. In particular, the interphase coating may include, and in particular may consist of, boron-doped pyrolytic carbon.

Preferably, the ratio [weight of polysiloxane]/[weight of fibers+weight of interphase coating] may be greater than or equal to 0.3%, e.g. greater than or equal to 0.5%, e.g. greater than or equal to 1%.

Preferably, the ratio [weight of polysiloxane]/[weight of fibers+weight of interphase coating] may be less than or equal to 5%.

It is advantageous not to exceed the value of 5% for this ratio in order to limit soiling of textile machinery that might subsequently be used for performing the textile operations.

Preferably, the ratio [weight of polysiloxane]/[weight of fibers+weight of interphase coating] may lie in the range 0.3% to 5%, more preferably 0.3% to 3.0%, e.g. in the range 0.3% to 1%.

The present invention also provides an assembly of yarns comprising a plurality of yarns as defined above.

The present invention also provides a method of preparing a yarn as defined above, the method including a step of treating a plurality of ceramic and/or carbon fibers covered in an interphase coating with a sizing composition, the sizing composition including a linear polysiloxane.

The fiber, the interphase coating, and the polysiloxane present in the sizing composition may be as described above.

In an implementation, the sizing composition is in the form of an emulsion, e.g. an oil-in-water emulsion. Under such circumstances, the polysiloxane is present in an oil phase of the emulsion. In a variant, the sizing composition is a solution in which polysiloxane is present. By way of example the solvent of the solution may be selected from: acetone, perchoroethylene, and dichloromethane. In another variant, the sizing composition is in the form of an oil including polysiloxane.

Preferably, the ratio [weight of deposited polysiloxane]/[weight of fibers coated in the interphase coating] may be greater than or equal to 0.3%, e.g. greater than or equal to 0.5%, e.g. greater than or equal to 1%. Preferably, the ratio [weight of deposited polysiloxane]/[weight of fibers coated in the interphase coating] may be less than or equal to 5%.

Preferably, the ratio [weight of deposited polysiloxane]/[weight of fibers coated in the interphase coating] may lie in the range 0.3% to 5%, more preferably 0.3% to 3.0%, e.g. in the range 0.3% to 1%.

The sizing composition may be deposited by any known method such as immersion, dip rolling, or spraying. It is then possible to perform a drying step that serves to eliminate all or part of the solvent or the water initially present in the sizing composition.

In an implementation, prior to the treatment with the sizing composition, the fibers may present an initial sizing coating, the initial sizing coating being eliminated in full or in part prior to the treatment with the sizing composition.

By way of example, this initial sizing coating may be eliminated by heat treatment.

It is thus possible in the context of the invention to start from a yarn having a sub-optimal initial sizing coating that does not confer the required flexibility and degree of protection for the fibers and the interphase coating. That initial sizing coating may be eliminated and then the yarn may be treated with the sizing composition in order to form a yarn of the invention having satisfactory properties for withstanding textile operations.

The present invention also provides a method of fabricating a fiber structure wherein one or more textile operations are performed using at least one yarn as defined above.

In an implementation, a woven structure may be fabricated by weaving a plurality of yarns as defined above.

In an implementation, the yarns may be wrapped before weaving, at least one wrapping yarn being wound around each of the yarns during wrapping.

Wrapping serves advantageously to further increase the protection of the yarn during weaving operations.

In an implementation, the fiber structure may be obtained after draping a plurality of fiber textures, with at least one of the fiber textures including a plurality of yarns as defined above.

The fiber structure may also be obtained after performing an automatic fiber placement method using a plurality of yarns as defined above.

Prior to being used for forming the fiber structure, the yarn(s) of the invention may be subjected to a stretch-breaking operation, the resulting stretch-broken yarn(s) being subjected to the textile operation(s) in order to form the fiber structure.

In an implementation, the fiber structure may be obtained by stitching together a plurality of fiber textures stitched with at least one yarn formed by a yarn as defined above, which yarn may optionally be a stretch-broken yarn. The fiber textures as stitched in this way may optionally include yarns of the invention.

In an implementation, after performing the textile operation(s), the method may include a step of eliminating all or part of the film covering the interphase coating.

Once the step of eliminating the film has been performed, at least 90% and preferably at least 95% of the weight of the film covering the fibers is eliminated.

In an implementation, the step of eliminating the film may be performed by subjecting the yarns to heat treatment, e.g. by imposing a temperature greater than or equal to 500° C., e.g. greater than or equal to 650° C., under an inert gas.

In a variant, the step of eliminating the film may be performed by putting the yarns into contact with a solvent suitable for dissolving the film, which solvent may be selected by way of example from: acetone; perchloroethylene; and dichloromethane.

In an implementation, it is possible to eliminate the film by performing both heat treatment and solvent treatment.

The present invention also provides a method of fabricating a part including a step of forming a matrix in the pores of a fiber structure obtained after performing the method as defined above.

The present invention also provides a fiber structure including a plurality of yarns as defined above.

By way of example, the fiber structure may be a woven structure having a plurality of woven yarns, with the yarns being as defined above.

BRIEF DESCRIPTION OF THE DRAWINGS

Other characteristics and advantages of the invention appear from the following description of particular embodiments of the invention given as non-limiting examples and described with reference to the accompanying drawings, in which:

FIG. 4 is a flow chart showing an implementation of a yarn fabrication method of the invention;

FIG. 4A shows one way of depositing the sizing composition on a set of fibers grouped together in a yarn suitable for use in the context of the present invention;

FIG. 5 is a flow chart showing various steps that may be performed using yarns of the invention;

FIG. 6A is a scanning electron microscope photograph of a yarn based on SiC fibers coated in an interphase coating;

FIG. 6B is a scanning electron microscope photograph of a yarn of the invention.

DETAILED DESCRIPTION OF EMBODIMENTS

Figure 1:
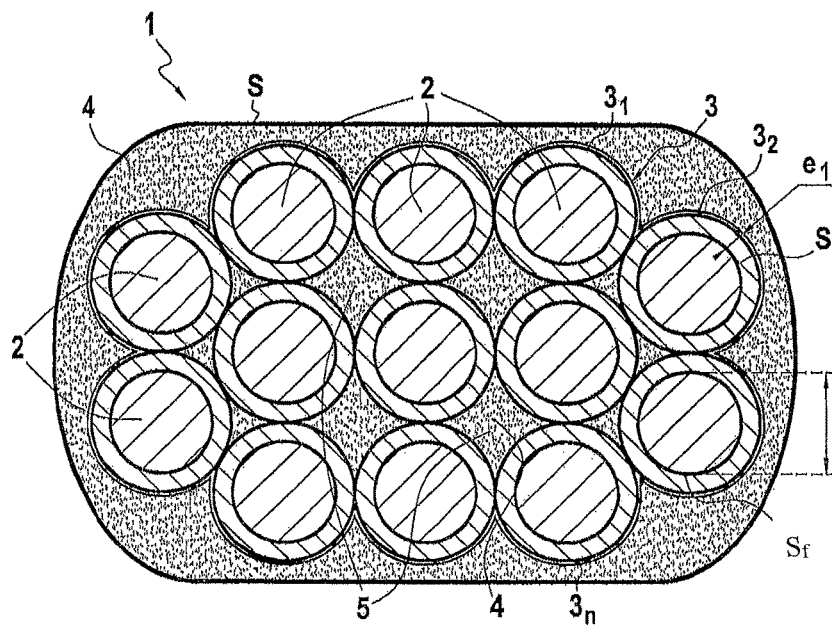
FIG. 1 is a diagrammatic section view of a first embodiment of a yarn of the invention.

FIG. 1 shows a section of a yarn 1 of the invention. The yarn 1 presents a film 4 obtained by sizing treatment and is suitable for being subjected to a textile operation, e.g. weaving. The yarn 1 has a plurality of fibers 2 made of silicon carbide (SiC) and/or of carbon. By way of example, suitable SiC fibers are supplied under the names "Nicalon", "Hi-Nicalon", or "Hi-Nicalon-S" from the Japanese supplier NGS, or "Tyranno SA3" from the supplier UBE. By way of example, suitable carbon fibers are supplied under the name "Torayca T300 3K" from the supplier Toray.

In an embodiment, all of the fibers of the yarn may be SiC fibers. In a variant, all of the fibers of the yarn may be carbon fibers. In another variant, the yarn may comprise a mixture of SiC fibers and of carbon fibers.

The diameter $d_1$ of the fibers 2, defined as their greatest transverse dimension, may for example be less than or equal to 30 micrometers ($\mu m$). For SiC fibers, the fiber diameter may lie in the range 8 $\mu m$ to 25 $\mu m$, for example. For carbon fibers, the fiber diameter may lie in the range 7 $\mu m$ to 10 $\mu m$, for example. The fibers 2 present in the yarn 1 may optionally all have the same diameter.

The fibers 2 present on their outer surfaces $S_f$ an interphase coating 3. In the embodiment shown, the interphase coating 3 is in contact with the fibers 2.

In the embodiment shown, the interphase coating 3 is a discontinuous interphase coating in which there is no continuity of material between the interphase coatings $3_1$, $3_2$, ..., $3_n$ covering each of the fibers 2. In this embodiment, the fibers are initially coated in an interphase coating and then the coated fibers are grouped together in a yarn. In the embodiment shown, the interphase coatings $3_1$, $3_2$, ..., $3_n$ are single-layer interphase coatings, but it would not go beyond the ambit of the invention for the interphase coatings to be multilayer interphase coatings.

The thickness $e_1$ of the interphase coating 3 may be greater than or equal to 50 nanometers (nm), and preferably greater than 200 nm.

The thickness $e_1$ of the interphase coating 3 may be less than or equal to 1 $\mu m$, preferably less than 600 nm. In particular, the thickness $e_1$ of the interphase coating 3 may lie in the range 50 nm to 1 $\mu m$, and preferably in the range 200 nm to 600 nm.

The thickness $e_1$ of the interphase coating 3 corresponds to the greatest dimension of the interphase coating 3 measured perpendicularly to the surfaces $S_f$ of the fibers 2.

A film 4 including linear polysiloxane covers the interphase coating 3. The film 4 in the embodiment shown is in contact with the interphase coating 3.

The film 4 provides cohesion and bridging between the fibers 2. The film 4 forms a continuous coating at the surface S of the yarn 1. As shown, the film 4 is also present inside the yarn 1 in its internal pores (i.e. in the gaps 5 between the fibers of the yarn 1). In the embodiment of FIG. 1, a sufficient quantity of polysiloxane has been deposited to ensure that the film 4 is present in each gap 5 between fibers of the yarn 1. The yarn 1 may be such that over at least 50% of its length, and possibly over substantially its entire length, the film 4 is present in each of the gaps 5 between fibers of the yarn 1. Such a film 4 may be obtained by using a ratio (deposited weight of polysiloxane)/(weight of treated fibers coated in the interphase coating) that is greater than about 5%.

Figure 2:
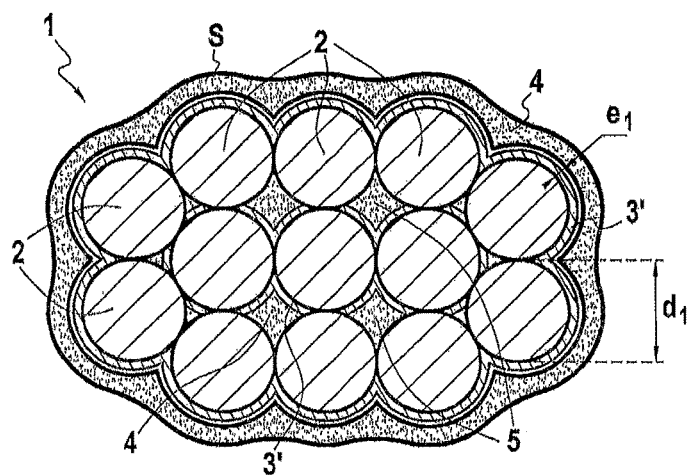
FIG. 2 is a diagrammatic section view of a second embodiment of a yarn of the invention.

FIG. 2 shows a variant yarn 1 of the invention. In this embodiment, the fibers 2 are initially grouped together into a yarn and the interphase coating 3' is formed thereafter. Once the interphase coating 3' has been formed, the sizing film 4 is deposited. In the embodiment of FIG. 1, a sufficient quantity of polysiloxane is deposited to ensure that the film 4 is present in each of the gaps 5 between the fibers of the yarn 1.

Figure 3:
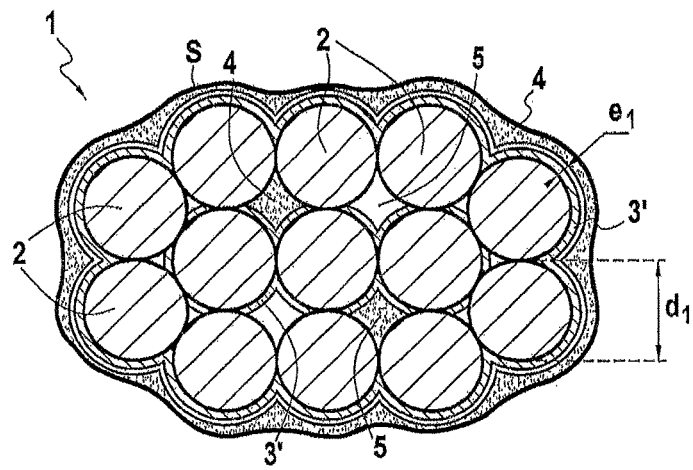
FIG. 3 is a diagrammatic section view of a third embodiment of a yarn of the invention.

FIG. 3 shows a variant yarn 1 of the invention. Unlike the embodiment of FIGS. 1 and 2, the polysiloxane is deposited in the example of FIG. 3 with a quantity that is insufficient to be present in each of the gaps 5 between the fibers of the yarn 1.

By modifying the quantity of polysiloxane deposited on the fibers, it is advantageously possible to modify the properties of the resulting yarn. Thus, a yarn obtained after depositing a relatively small quantity of polysiloxane presents greater flexibility resulting from the relatively dispersed bridging between the fibers. A yarn obtained after depositing a relatively large quantity of polysiloxane presents great cohesion because of the strong binding between the fibers provided by the film.

Figure 8:
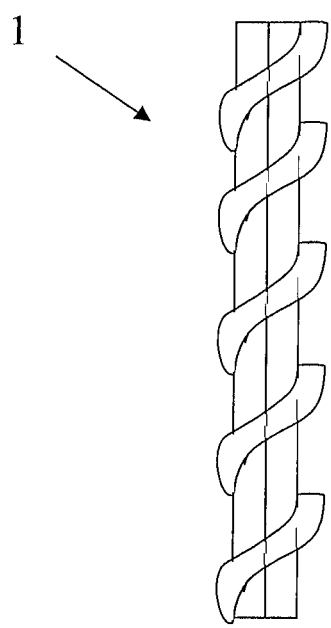
FIG. 8 shows a schematic representation of a wrapped yarn.

In an implementation shown in FIG. 8, the yarns 1 may be wrapped before weaving, at least one wrapping yarn being wound around each of the yarns during wrapping. Wrapping serves advantageously to further increase the protection of the yarn during weaving operations.

FIG. 4 is a flow chart showing a succession of steps enabling a yarn of the invention to be fabricated.

In a first step (step 10), an interphase coating is formed on a plurality of ceramic and/or carbon fibers. The interphase coating may be formed using any known method. As mentioned above, the interphase coating may be formed on the fibers while they are already grouped together as a yarn. In a variant, an interphase coating is initially formed on each of the fibers, and the fibers are then grouped together to form a yarn.

The fibers covered by the interphase coating are then treated by a sizing composition (step 20). The sizing composition includes a linear polysiloxane. During step 20, the sizing composition is put into contact with the fibers covered in the interphase coating. As mentioned above, the sizing composition may be deposited by any known method such as impregnation, dip rolling, or spraying. The sizing composition is preferably deposited by impregnation or by dip rolling. Such methods serve advantageously to obtain a deposit that is uniform.

A drying step may then be performed, serving to eliminate some or all of the solvent or water initially present in the sizing composition.

The sizing composition used may be as described above and it may be deposited in the proportions specified above. By way of example, the sizing composition may be deposited as a temperature of 20° C.

FIG. 4A shows one way of depositing a sizing composition on fibers that is suitable for use in the context of the present invention. In this implementation, fibers covered in an interphase coating and grouped together to form a yarn F are caused to travel through a nozzle 22. The sizing composition 21 is deposited on the yarn F by being injected through the nozzle 22. Once deposition has been achieved, a drying step may be performed in order to obtain a yarn of the invention.

FIG. 5 shows an example of a succession of steps performed using a plurality of yarns of the invention. Initially, one or more textile operations are performed involving a plurality of yarns of the invention in order to form a fiber structure (step 30). During step 30, a plurality of yarns of the invention may for example be woven together in order to form a woven structure. More generally, the yarns of the invention may be used in any textile technique for making any textile surface.

Once the textile operation(s) is/are completed, the film including polysiloxane may be eliminated (step 40) by heat treatment or by treatment with a solvent, as explained above. In order to eliminate the film with a solvent, it is possible initially to immerse all or part of the fiber structure in a bath of solvent, e.g. for one hour at ambient temperature or while hot, and then to perform one or more rinsing operations at ambient temperature with the same solvent. The solvent may then be air evaporated and the fiber structure can then be dried.

By way of example, the fiber structure as obtained in this way may then be subjected to consolidation and/or densification treatment with a matrix in a manner known to the person skilled in the art (step 50). The treatment may result in a part being formed in which the fiber structure is present within a matrix, e.g. a ceramic or carbon matrix, where it performs a mechanical reinforcement function.

By way of example, the part formed in this way may constitute an after-body element of an airplane engine, e.g. an exhaust casing, an exhaust cone or "plug", or a secondary nozzle. The part formed in this way may also constitute an element of an aeroengine, e.g. a ring, a nozzle, or a vane.

EXAMPLES

Example 1 (Invention)

This element relates to the sizing treatment performed in the context of the invention.

SiC fibers supplied under the name Hi Nicalon type S by the supplier NGS were used. The fibers were covered in an interphase coating having a thickness of 500 nm. A photograph of a yarn including these coated fibers is given in FIG. 6A.

The yarn formed by the SiC fibers coated in this way was then treated with a sizing composition. A sizing composition was used that is in the form of an emulsion presenting an oil phase dispersed in water. The oil phase was constituted by a Bluesil™ 47 V1000 oil having viscosity of 1000 square millimeters per second ($mm^2$/s), the oil including linear poly(dimethylsiloxane).

Several tests were undertaken while varying the quantity of PDMS deposited on the yarn, as set out in Table 1 below. Whatever the quantity deposited, good flexibility and good weaveability were obtained.

TABLE 1

| Wt % of PDMS deposited on yarn | Yarn appearance | |
| --- | --- | --- |
| 8.0 | flexible | bridging between fibers |
| 6.0 | flexible | bridging between fibers |
| 3.0 | flexible | bridging between fibers |
| 2.0 | flexible | bridging between fibers |
| 1.0 | flexible | no bridging |
| 0.7 | flexible | no bridging |
| 0.5 | flexible | no bridging |
| 0.3 | flexible | no bridging |

In those tests, the sizing composition was applied at 20° C. using the immersion method or the "recto/verso" dip rolling method (i.e. two successive dip rolling operations for depositing size on both sides of the yarn). The contact time of the yarn with the emulsion did not exceed 3 seconds in the immersion method and did not exceed about 2 seconds in the dip rolling method (i.e. a maximum of 4 seconds for this method).

The yarns as treated in this way were dried by passing through a drying oven with a length of about 1 meter (m) that imposed a temperature lying in the range 120° C. to 250° C.

Furthermore, FIG. 6B shows a photograph of a yarn of the invention in which the deposited weight of PDMS relative to the weight of treated fibers is 1%. The sizing deposit is uniform and the interphase coating is protected.

Figure 7:
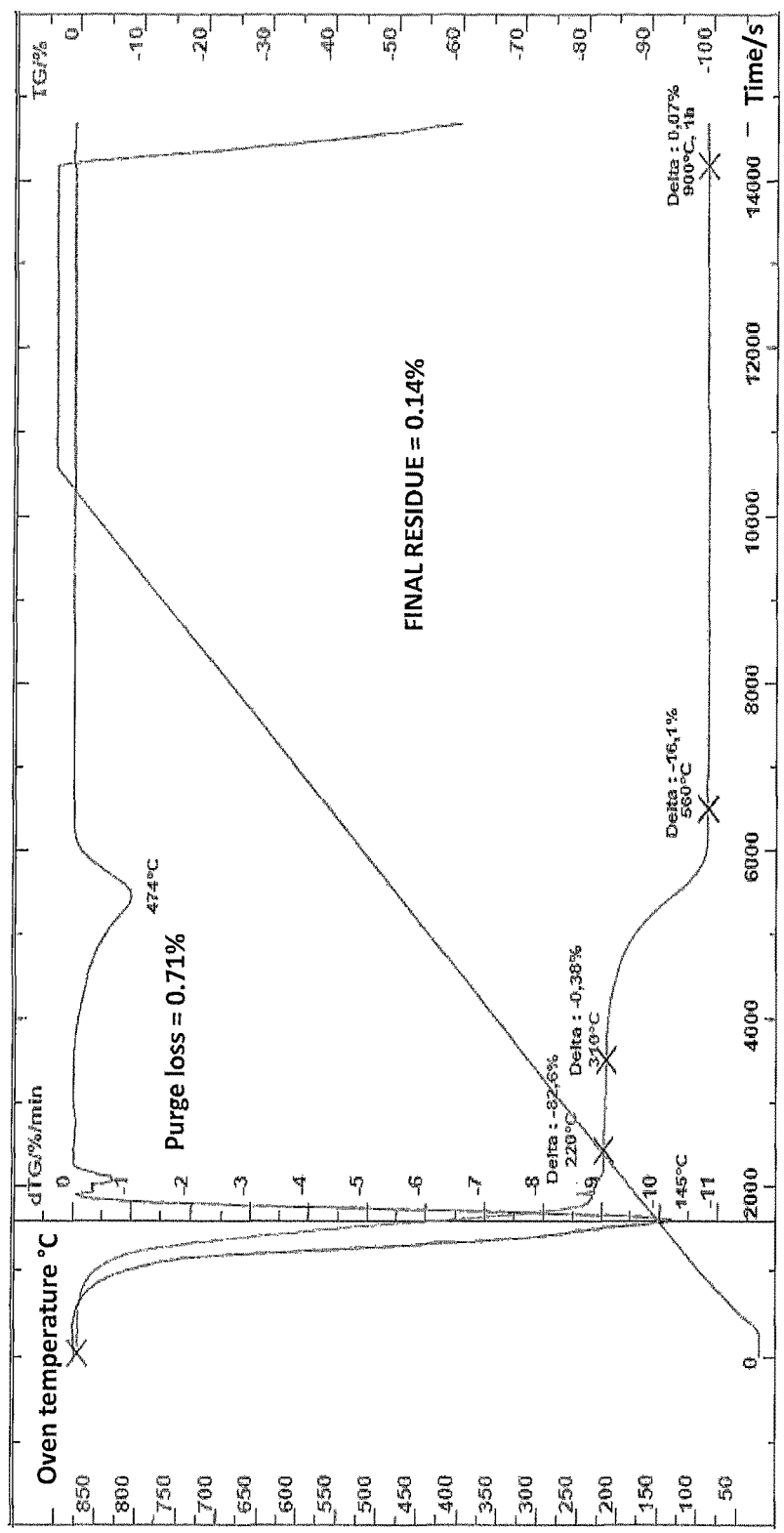
FIG. 7 shows the result of thermogravimetric analysis of a sizing composition usable in the context of the invention.

Furthermore, the sizing composition used to form the protective film can be eliminated almost completely (>99.5%) by applying heat (see FIG. 7 showing thermal elimination of the sizing composition used for forming the sizing coating: the result of thermogravimetric analysis up to 900° C. under an atmosphere that is inert relative to a PDMS emulsion having a concentration of 20% by weight).

Example 2 (Comparative)

The performance of a yarn of the invention obtained as in Example 1 (yarn 1) was compared in particular with the performance of a yarn (yarn 2) obtained after sizing treatment but with a composition including polyvinyl alcohol (PVA) instead of linear poly(dimethylsiloxane).

The yarn 2 was fabricated in the same manner as the yarn 1 except for the sizing treatment which was performed using a PVA based composition instead of the PDMS based emulsion.

The results obtained are given in Table 2 below. The yarn 2 does not give full satisfaction insofar as it presents a rigid nature and weaveability that is not very satisfactory.

As shown in Table 2 below, other sizing compositions were tested, namely a composition having the trade name Avirol KW79 supplied by the supplier Pulcra Chemicals and the composition having the trade name Hydrolube 763 (written HL763) supplied by the supplier Michelman. Those compositions do not enable yarns to be obtained that present good weaveability or a protected interphase coating.

TABLE 2

| Type of sizing | Quantity on yarn | Yarn appearance | Yarn cohesion | Weaveability | Deposit |
|---|---|---|---|---|---|
| KW79 | 0.8 wt % | good | good | not satisfactory | non-uniform |
| HL763 | 0.6 wt % | good | good | not satisfactory | non-uniform |
| Yarn 2 | 1.2 wt % | rigid | good | not satisfactory | adequate |
| Yarn 1 | 1 wt % | flexible | very good | satisfactory | uniform |

The term "comprising/containing a" should be understood as "comprising/containing at least one".

The term "lying in the range . . . to . . . " should be understood as including the limits.

The invention claimed is:

1. A sized yarn for subjecting to a textile operation, the yarn comprising:
   a plurality of ceramic and/or carbon fibers;
   an interphase coating covering the fibers; and
   a film covering the interphase coating and including a linear polysiloxane.

2. A yarn according to claim 1, wherein the interphase coating includes pyrolytic carbon, boron-doped carbon, or BN.

3. A yarn according to claim 1, wherein a ratio [weight of polysiloxane]/[weight of fibers+weight of interphase coating] is greater than or equal to 0.3%.

4. A yarn according to claim 1, wherein the polysiloxane is a linear poly(dimethylsiloxane).

5. A yarn according to claim 1, wherein the fibers include SiC fibers.

6. A method of preparing a yarn according to claim 1, including a step of treating a plurality of ceramic and/or carbon fibers covered in an interphase coating with a sizing composition, the sizing composition including a linear polysiloxane.

7. A method according to claim 6, wherein, prior to the treatment with the sizing composition, the fibers present an initial sizing coating, the initial sizing coating being eliminated in full or in part prior to the treatment with the sizing composition.

8. A method of fabricating a fiber structure wherein one or more textile operations are performed using at least one yarn according to claim 1.

9. A method according to claim 8, wherein the at least one yarn comprises a plurality of yarns and wherein a woven structure is fabricated by weaving said plurality of yarns.

10. A method according to claim 9, wherein the yarns are wrapped before weaving, at least one wrapping yarn being wound around each of the yarns during wrapping.

11. A method according to claim 8, wherein, after performing the one or more textile operations, the method includes a step of eliminating all or part of the film covering the interphase coating.

12. A method of fabricating a part including a step of forming a matrix in the pores of a fiber structure obtained after performing the method according to claim 8.

13. A fiber structure including a plurality of yarns according to claim 1.

14. The yarn according to claim 1, wherein the film completely covers the interphase coating.

15. The yarn according to claim 1, wherein the sized yarn is completely covered by the film.

16. The yarn according to claim 1, wherein the film entirely covers an outer surface of the sized yarn.

17. The yarn according to claim 1, wherein the film is present in each gap formed between the fibers.

* * * * *